US012573868B2

(12) United States Patent
Kessner et al.

(10) Patent No.: US 12,573,868 B2
(45) Date of Patent: Mar. 10, 2026

(54) SYSTEMS AND METHODS FOR BATTERY CHARGING USING CIRCUIT MODELING

(71) Applicant: Iontra Inc, Centennial, CO (US)

(72) Inventors: David Kessner, Denver, CO (US); John R. Howlett, III, Centennial, CO (US)

(73) Assignee: Iontra Inc, Centennial, CO (US)

( * ) Notice: Subject to any disclaimer, the term of this patent is extended or adjusted under 35 U.S.C. 154(b) by 963 days.

(21) Appl. No.: 17/566,535

(22) Filed: Dec. 30, 2021

(65) Prior Publication Data

US 2022/0209562 A1 Jun. 30, 2022

Related U.S. Application Data

(60) Provisional application No. 63/132,250, filed on Dec. 30, 2020.

(51) Int. Cl.
*H02J 7/00* (2006.01)

(52) U.S. Cl.
CPC ....... *H02J 7/00711* (2020.01); *H02J 7/00034* (2020.01); *H02J 7/00714* (2020.01); *H02J 7/007182* (2020.01)

(58) Field of Classification Search
CPC .............. H02J 7/00711; H02J 7/00034; H02J 7/007182; H02J 7/00714
USPC ........................................................ 320/137
See application file for complete search history.

(56) References Cited

U.S. PATENT DOCUMENTS

| | | | |
|---|---|---|---|
| 8,773,092 B2 | 7/2014 | Fishelov et al. | |
| 8,907,631 B1 * | 12/2014 | Gurries ................. | G01K 13/00 |
| | | | 320/141 |
| 9,153,991 B2 | 10/2015 | Chaturvedi et al. | |
| 9,912,181 B2 | 3/2018 | Gurries et al. | |
| 10,148,108 B2 | 12/2018 | Nguyen | |
| 10,644,598 B1 | 5/2020 | Lewinski Komincz et al. | |
| 11,708,005 B2 * | 7/2023 | Nguyen ................. | H02J 7/005 |
| | | | 320/118 |

(Continued)

FOREIGN PATENT DOCUMENTS

| | | |
|---|---|---|
| CN | 115699504 A | 2/2023 |
| CN | 116566201 A | 8/2023 |

(Continued)

OTHER PUBLICATIONS

Castaldo, Adam; Switching Regulator Fundamentals, 2019, Texas Instruments (Year: 2019).*

(Continued)

*Primary Examiner* — Suresh Memula
(74) *Attorney, Agent, or Firm* — Derek Donahoe; Polsinelli PC

(57) ABSTRACT

A system for charging a battery comprising a first switch operably coupled with a power supply. An inductive element, which may be a part of filter, is in operable communication with the switch. The system includes a processor in communication with the switch and in communication with a model of the inductive element. The processor is configured to execute instructions to control the switch to generate a sequence of pulses at the first inductive element to produce a shaped charge waveform responsive to running the model to generate the shaped charge waveform.

20 Claims, 8 Drawing Sheets

(56) References Cited

U.S. PATENT DOCUMENTS

| | | | |
|---|---|---|---|
| 2003/0038612 A1* | 2/2003 | Kutkut | H02J 7/02 |
| | | | 320/140 |
| 2008/0239772 A1* | 10/2008 | Oraw | H02M 7/4837 |
| | | | 363/60 |
| 2013/0024034 A1 | 1/2013 | Iino et al. | |
| 2013/0054041 A1 | 2/2013 | Fishelov et al. | |
| 2014/0312828 A1* | 10/2014 | Vo | H02J 7/0016 |
| | | | 429/7 |
| 2016/0013719 A1 | 1/2016 | Babazadeh et al. | |
| 2016/0090001 A1* | 3/2016 | Nomoto | B60L 7/18 |
| | | | 320/109 |
| 2018/0375342 A1 | 12/2018 | Sultenfuss et al. | |
| 2019/0120910 A1* | 4/2019 | Ghantous | H01M 10/44 |
| 2022/0029443 A1 | 1/2022 | Konopka et al. | |
| 2023/0042872 A1 | 2/2023 | Sun | |
| 2023/0099305 A1 | 3/2023 | Howlett, III et al. | |
| 2023/0268770 A1* | 8/2023 | Howlett, III | H02J 50/10 |
| | | | 320/108 |
| 2024/0039061 A1 | 2/2024 | Howlett, III et al. | |

FOREIGN PATENT DOCUMENTS

| | | | |
|---|---|---|---|
| CN | 118363831 | A | 7/2024 |
| EP | 3350901 | B1 | 5/2023 |
| JP | 2002354786 | A | 12/2002 |
| JP | 2010226606 | | 10/2010 |
| JP | 2011024395 | A | 2/2011 |
| JP | 2014060863 | A | 4/2014 |
| KR | 101525941 | B1 | 6/2015 |
| WO | 2021114875 | A1 | 6/2021 |
| WO | 2022026934 | A1 | 2/2022 |

OTHER PUBLICATIONS

International Searching Authority, International Search Report and Written Opinion, issued in connection with International Application No. PCT/US2021/065776, mailed Apr. 25, 2022 (13 pages).
International Searching Authority, International Search Report & Written Opinion, issued in connection with International Application No. PCT/US2022/047280, mailed Mar. 21, 2023 (9 pages).

* cited by examiner

500

502 — DETERMINE TARGET SHAPE OF CHARGE SIGNAL FOR CHARGING BATTERY CELL

504 — APPLY TARGET CHARGE SIGNAL TO CIRCUIT MODEL

506 — GENERATE CONTROL SIGNALS TO CHARGE CIRCUIT COMPONENTS TO GENERATE TARGET CHARGE SIGNAL

602 — CALIBRATE MODEL

604 — CALIBRATE SIGNAL GENERATION

606 — CHARGE

SYSTEMS AND METHODS FOR BATTERY CHARGING USING CIRCUIT MODELING

CROSS-REFERENCE TO RELATED APPLICATION

This application is related to and claims priority under 35 U.S.C. § 119(e) from U.S. Patent Application No. 63/132, 250 filed Dec. 30, 2020 entitled "Systems and Methods for Battery Cell Charging Using Circuit Modeling," the entire contents of which is incorporated herein by reference for all purposes.

TECHNICAL FIELD

Embodiments of the present invention generally relate to systems and methods for charging a battery, and more specifically for the generation of a shaped charging signal involving a model of circuit components involved in shaping the signal and/or filtering unwanted frequency components from the signal prior to application to the battery.

BACKGROUND AND INTRODUCTION

Countless different types of electrically powered devices, such as power tools, mobile computing and communication devices, portable electronic devices, and electrically powered vehicles of all sorts including scooters and bicycles, use rechargeable batteries as a source of operating power. Rechargeable batteries are limited by finite battery capacity and must be recharged upon depletion. Recharging a battery may be inconvenient as the powered device must often be stationary during the time required for recharging the battery. Depending on battery size, recharging can take hours. Moreover, battery charging is often accompanied by degradation of battery performance. As such, significant effort has been put into developing battery charging technology to reduce the time needed to recharge the battery, improve battery performance, reduce degradation of the battery from charging, among other things.

It is with these observations in mind, among others, that various aspects of the present disclosure were conceived and developed.

SUMMARY

Aspects of the present disclosure involve a system for charging a battery including a first switch operably coupled with a power supply. The system further involves a first inductive element, which may be an inductor, inductors coupled in series or parallel or combinations thereof, a transformer or inductive portion of a transformer such as the primary or secondary windings of a transformer, among other possible inductive elements, in operable communication with the first switch. The system further includes a processor in communication with the switch and in communication with a model of the inductive element. Additional components may also be modeled. The processor is configured to execute instructions to control the switch to generate a sequence of pulses at the first inductive element to produce a shaped charge waveform responsive to running the model to generate the shaped charge waveform.

In various aspects, the processor may further be configured to execute the sequence of pulses with the model and adjust the sequence of pulses to produce the shaped waveform. Other features may be modeled. In one example, the model comprises a configurable inductance value and a configurable resistance value. The processor may further be configured to execute instructions to calibrate the model by applying a known signal to the inductive element and obtaining a first measurement (e.g., current or voltage) at a first point on the known signal and a second measurement (e.g. current or voltage) at a second point on the known signal, and changing at least one of the configurable inductance value or the configurable resistance value when at least one of the first measurement at the first point or the second measurement at the second point does not match a respective first intended measurement at the first point or a second intended measurement at the second point.

In various additional aspects, the system may further include a second switch (e.g., a transistor or diode) in communication with the first switch (e.g., a transistor) at a common node, where the common node is operably coupled with the inductive element or more generally a filter that includes the inductive element. Various aspects of the filter, as well, as the switches may be modeled.

The system may further include a second inductor coupled with the first inductive element, with both the first and second elements part of the filter. A battery may be operably coupled with the first inductor, the second inductor or more generally the filter, in various possible embodiments, and receives the shaped charge waveform. The various embodiments are shaping the charge waveform and are not applying a conventional constant current or constant voltage type charge signal although it is conceivable that at times the signal will be shaped to a constant signal. A capacitor, which may also be considered a part of the filter, may be coupled between the first inductive element and the second inductor and neutral (ground).

In another aspect, a capacitor may be operably coupled with the power supply and the first switch. The capacitor being configured and arranged to deliver energy, e.g., shapable current, through the switch to produce the shaped charge waveform by way of the first inductive element and/or filter more generally.

The model may further comprise a model of a second inductor element and a model of a battery being charged. The model element of the first and second inductor element, as well as the battery, may be combined and represented by an inductor value. The model may also include a resistance value, for various filter elements, which may also be combined.

In another aspect of the present disclosure, a method of charging a battery comprises, from a processor in communication with a switch and in communication with a model of a filter comprising a first inductive element coupled with the switch, controlling the switch to generate a sequence of pulses at the filter to produce a shaped charge waveform responsive to running the model to generate the shaped charge waveform. The method may further involve generating a sequence of pulses at the filter element to produce a known signal from the filter; and when a measured attribute of the known signal does not match an intended measurement, calibrating the model by adjusting at least one attribute of the model.

Calibration of the model may involve, when the at least one attribute of the model comprises a configurable inductance value and a configurable resistance value, applying the known signal to the filter and obtaining a first measurement at a first point on the known signal and a second measurement at a second point on the known signal, and changing at least one of the configurable inductance value or the configurable resistance value when at least one of the first measurement at the first point or the second measurement at the second point does not match a respective first intended measurement at the first point or a second intended measurement at the second point.

The filter may further comprise a second inductor coupled with the first inductive element, the first inductive element being a first inductor, and a capacitor coupled between the first inductor and the second inductor and neutral. The model may model various of these additional filter components, alone or in combinations. The model may further comprise the switch or switches. The model may further comprise a capacitor operably coupled with a power supply and operably coupled with the switch.

BRIEF DESCRIPTION OF THE DRAWINGS

The various objects, features, and advantages of the present disclosure set forth herein will be apparent from the following description of embodiments of those inventive concepts, as illustrated in the accompanying drawings. It should be noted that the drawings are not necessarily to scale and may be representative of various features of an embodiment, the emphasis being placed on illustrating the principles and other aspects of the inventive concepts. Also, in the drawings the like reference characters may refer to the same parts or similar throughout the different views. It is intended that the embodiments and figures disclosed herein are to be considered illustrative rather than limiting.

DETAILED DESCRIPTION

Figure 1:
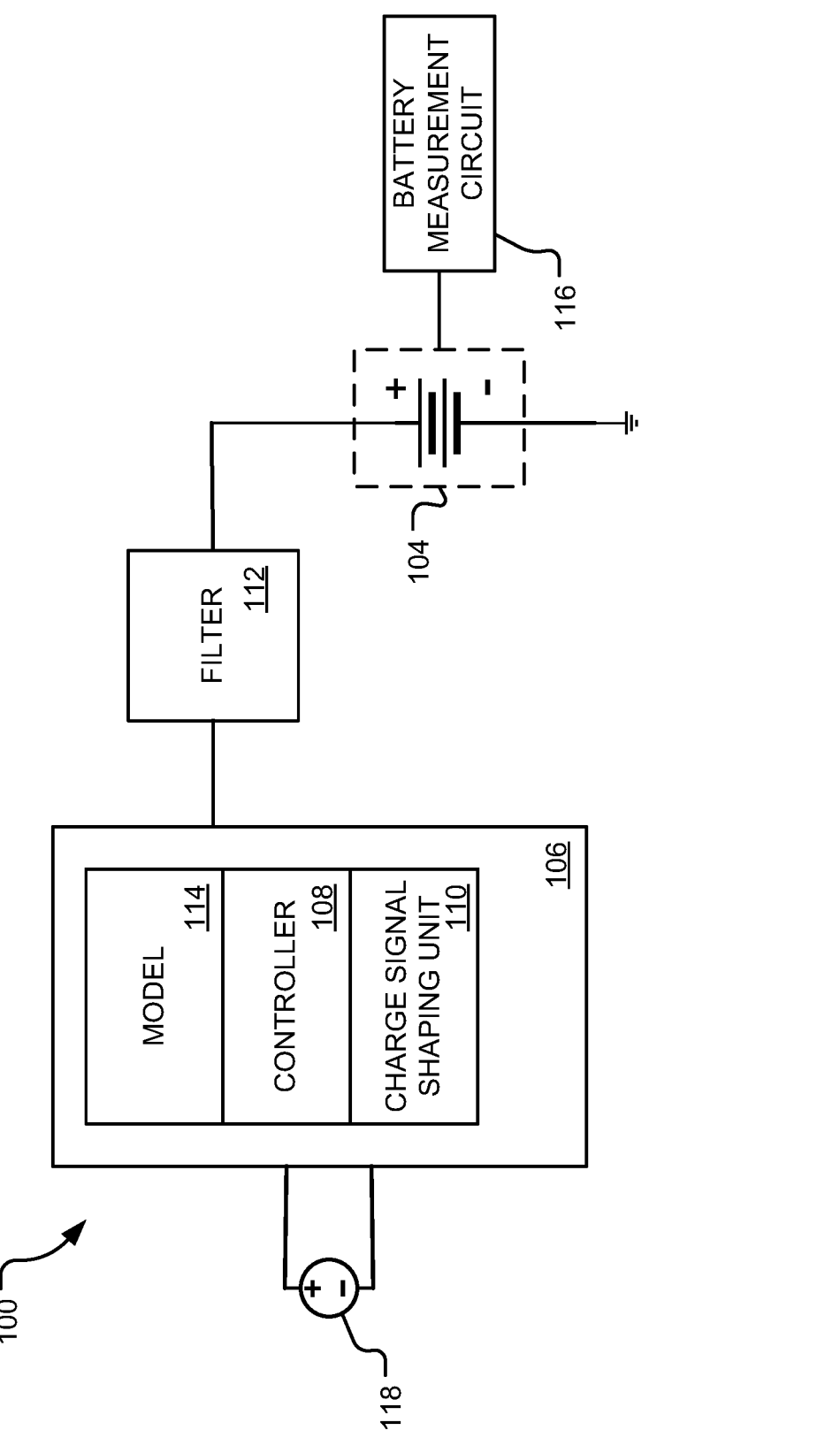
FIG. 1 is a system diagram of a charging system in accordance with one embodiment.

Systems, circuits, and methods are disclosed herein for charging (recharging) a battery. The terms charging and recharging are used synonymously herein. Aspects of the present disclosure may provide several advantages, alone or in combination, relative to conventional charging. For example, the charging techniques described herein may reduce the rate at which an anode is damaged, may reduce heat generated during charging, which may have several follow-on effects such as reducing electrode and other battery damage, reducing fire or short circuit risks, and the like. In other examples, the charging techniques described herein may allow for higher charging rates to be applied to the battery and may thus allow for faster charging. Conversely, through the systems, circuits, and methods discussed, less energy may be required to charge a battery as compared to various forms of conventional charging circuits and methods. The techniques may all optimize charge rates to be used, and which consider other issues such as cycle life and temperature. In one example, charge rates and parameters may be optimized to provide for a longer battery life and greater charging energy efficiency.

In one example, the various embodiments discussed herein charge a battery by generating a charge signal that is controllably shaped using a model of one or more components of a charge signal shaping circuit. Conventional charge techniques like constant current or constant voltage do not involve charge signal shaping and hence control is relatively straightforward, and there is no need for the modeling techniques discussed herein. In one implementation, a charge signal shaping algorithm may provide an expected or intended charge signal for charging a battery to a circuit model. The model may be used to confirm and/or adjust the controls for generating the signal. The model may also, based on the intended charge signal, output one or more control signals to switches or other components of the charge signal shaping circuit based on a modeling of the components of the charge signal shaping circuit. In some instances, aspects of the shape of the shaped charge signal may correspond to a harmonic (or harmonics) associated with an optimal transfer of energy to the battery, although the purpose of the system is to be able to efficiently generate any arbitrarily shaped charging signal and apply the same to the battery, among other goals. The shape, which may be any arbitrary shape defined by the controls, is nonetheless controlled. The control signals to the components of the charge signal shaping circuit may be based on a model of the components of the circuit rather than based on a feedback of measurements of the charge signal at the battery or of the battery itself during charging such as voltage and current, which are typical of battery charging circuits. In some instances, this approach may be referred to as a "feed-forward" technique.

The feed-forward technique of utilizing a model of the circuit to determine the control signals for defining a charge signal may provide several advantages including accuracy and speed of signal adjustment. Moreover, the arrangement may be operable with fewer components than other approaches thereby reducing costs, using less PCB real estate, among other advantages.

Practically speaking, it is difficult to rely solely on a model of a circuit without some type of feedback to adjust for model errors, adjust for component drift, adjust for effects of temperature or other effects on circuit components, adjust for changes in the battery, and periodically provide additional data to the model to alter its output, among other things. For example, during operation of the charge circuit, aspects of the battery under charge may change in response to the state of charge (SoC), state of health (SoH), and the like. Thus, in some instances, aspects of the battery may be obtained and used to adjust the model of the circuit. The model may address various components of the circuits used to shape and filter the charge signal, and values or functionality of those components may change over time, which changes may be addressed in the model. In general, modeling of the circuit provides an estimation and predetermination of charge signals to counter the relative slow feedback path from battery and other sensors. In addition or alternatively, modeling provides a means where effective signal control may be achieved without complicated signal measurement, component measurement or other feedback mechanisms, which are costly, consume valuable power and PCB real-estate, among other things. Nonetheless, the model may be occasionally updated based with feedback information to adjust the model response based on changes of the battery and/or circuit elements.

The term "battery" in the art and herein can be used in various ways and may refer to an individual cell having an anode and cathode separated by an electrolyte, solid or liquid, as well as a collection of such cells connected in various arrangements. A battery or battery cell is a form of electrochemical device. Batteries generally comprise repeating units of sources of a countercharge and electrode layers separated by an ionically conductive barrier, often a liquid or polymer membrane saturated with an electrolyte. These layers are made to be thin so multiple units can occupy the volume of a battery, increasing the available power of the battery with each stacked unit. Although many examples are discussed herein as applicable to a battery, it should be appreciated that the systems and methods described may apply to many different type of batteries ranging from an individual cell to batteries involving different possible interconnections of cells such as cells coupled in parallel, series, and parallel and series. For example, the systems and methods discussed herein may apply to a battery pack comprising numerous cells arranged to provide a defined pack voltage, output current, and/or capacity. Moreover, the implementations discussed herein may apply to different types of electrochemical devices such as various different types of lithium batteries including but not limited to lithium-metal and lithium-ion batteries, lead-acid batteries, various types of nickel batteries, and solid-state batteries, to name a few. The various implementations discussed herein may also apply to different structural battery arrangements such as button or "coin" type batteries, cylindrical cells, pouch cells, and prismatic cells.

FIG. 1 is a schematic diagram illustrating an example charge signal generator arrangement 100 for recharging a battery 104. The generator includes a processing or otherwise control unit 106 that may include a controller 108, such as a microcontroller, FPGA (field-programmable gate array), ASIC (application-specific integrated circuit), microprocessor, combinations thereof, or other processing arrangement, that produces controls for generating a charge signal from a charge signal shaping unit 110, which may include a filter 112. The controller is in communication with a model 114 of components of the charge signal shaping unit and/or filter to produce the control instructions to the charge signal shaping unit. The control unit, including the controller and model, may be an integrated unit. The system may also receive battery measurements from a battery measurement circuit 116, such as current and/or voltage measurements at battery terminals of the battery 104 in the presence of a charge signal or calibration signal or otherwise, and those battery measurements used to calibrate or adjust the model or otherwise affect charge control. In general, the generator may also include or be operably coupled with a power source 118, which may be a voltage source or a current source. In one embodiment, the power source 118 is a direct current (DC) voltage source, although alternating current (AC) sources are also contemplated. In various alternatives, the power source 118 may include a DC source providing a unidirectional current, an AC source providing a bidirectional current, or a power source providing a ripple current (such as an AC signal with a DC bias to cause the current to be unidirectional). In general, the power source 118 supplies the charge energy, e.g., current, that may be shaped by the control unit 106 and filter components to produce a controllably shaped charge signal to charge the battery 104. In one example, a circuit controller 108 may provide one or more inputs to the power signal shaping circuit to generate pulses to the filter, which produces the shaped charge signal at the output of the filter to the battery.

In some instances, the charge signal shaping circuit 110 may alter energy from the power source 118 to generate a charge signal that is shaped based on charge conditions at the battery 104, such as a charge signal that at least partially corresponds to a harmonic or harmonics based on the impedance when a signal comprising the harmonic or attributes of the harmonic is applied to the battery 104. In the example of FIG. 1 and otherwise, the circuit 100 may include a battery measurement circuit 116 connected to the battery 104 to measure cell voltage and/or charge current, as well as other battery attributes like temperature and measure or calculate the impedance the battery 104. In one example, battery characteristics may be measured based on the applied charge signal. In another example, battery cell characteristics may be measured as part of a routine that applies a signal with varying frequency attributes to generate a range of battery cell characteristic values associated with the different frequency attributes to characterize the cell, which may be done prior to charging, during charging, periodically during charging, and may be used in combination with look-up techniques, and other techniques. The battery characteristics may vary based on many physical of chemical features of the battery, including a state of charge and/or a temperature of the battery. As such, the battery measurement circuit 116 may be controlled by the circuit controller 106 to determine various battery characteristic values of the battery 104 during recharging of the, among other times, and provide the measured of battery characteristic values to the circuit controller 108 or other parts of the generator 100.

The circuit controller 108 may generate an intended charge signal for efficient charging of the battery 104. For example, a measured impedance of the battery 104 or signal definitions characterized from understanding impedance effects of signals on a battery may be used by the circuit controller 108 to generate a charge signal with attributes that correspond to a harmonic associated with a minimum impedance value of the battery 104. As such, the circuit controller 108 may execute a charge signal algorithm that outputs a charge signal shape based on measured, characterized and/or estimated charging conditions of the battery 104. The circuit controller 108 may then generate one or more control signals based on the charge signal algorithm and provide those control signals to the charge signal shaping unit 110. The control signals may, among other functions, shape the charge signal to approximate the shaped charge signal determined by the algorithm. The charge signal shaping circuit, or more particularly the filter, may further filter any unwanted frequency attributes from the signal. In some instances, the shaped charge signal may be any arbitrarily shaped charge signal, such that the charge signal does not conform to a traditionally repeating charge signal, such as a repeating square wave or triangle wave charge signal.

Figure 2:
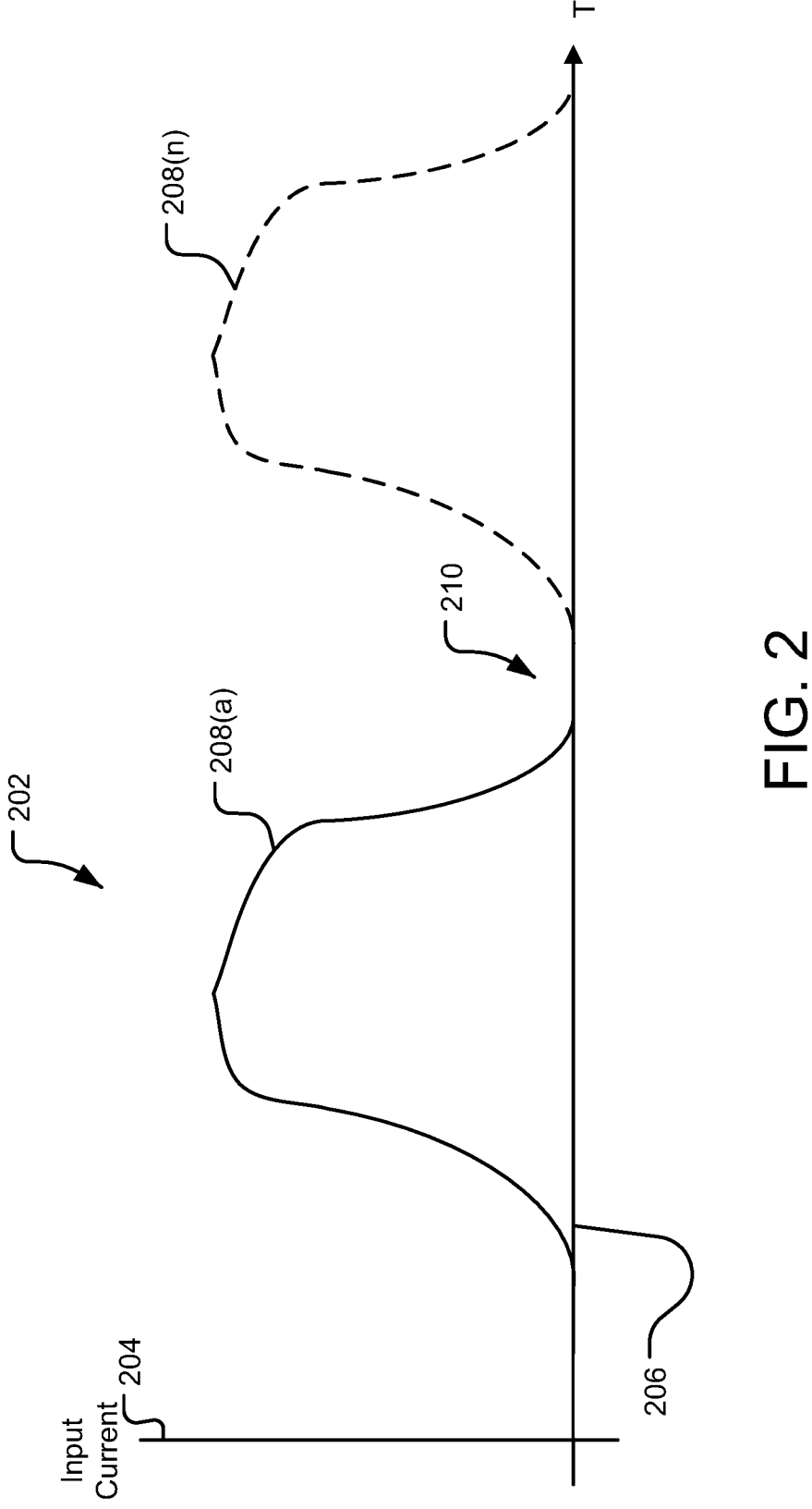
FIG. 2 is a signal graph of an example a controlled arbitrarily shaped charge waveform for charging a battery in accordance with one embodiment.

For example, FIG. 2 is a signal diagram 202 of an arbitrarily shaped battery charging signal 200 for charging a battery cell 204. The shape is described as arbitrary; however, it should be appreciated that the shape is controlled, and it can take on any arbitrary shape depending on the control. The signal diagram 202 illustrates a charge signal 208 graphed as input current 204 versus time 206. The shape of the charge signal 208 may be determined by a charge signal algorithm or program executed by circuit controller 210. In one instance, the shape of the charge signal 208 may be based on characteristics of the battery cell 204, such as a minimum impedance value of the battery cell. In another example, the shape of the charge signal 208 may correspond to a harmonic associated with impedance value of the cell. In these examples, various parts of the shape are based on the impedance response, among other things, of different harmonics on the impedance. In many instances, the shape is based on harmonics at or around the lowest impedance, while not limited to a harmonic at the lowest impedance. In some instances, the signal, such as the signal shown in FIG. 2, may be repeating sequence of such signals (e.g., 208(*a*)-208(*n*)) between when little or no charge current 210 is applied to the battery and a period of time when charge current (e.g., signal 208(*a*) or 208(*n*)) is applied to the battery. In still another example, various aspects of the shape of the charge signal 208 may correspond to a harmonic associated with one or both of a conductance or susceptance of an admittance of the battery 104. Where impedance values are being considered, the technique assesses harmonic values where the values, alone or in combination, are at a relatively low impedance. With admittance, the techniques assess harmonics where admittance is relatively high of conductance and susceptance alone or in combination. Given the generally inverse relationship, the term impedance as used herein may include its inverse admittance. In general, the charge signal shaping algorithm of the generator 100 may sculpt or otherwise determine the shape of the charge signal 208 based on any characteristics of the battery 104, either measured, modeled, or estimated.

In some conventional charging scenarios, pulse charging has been explored. However, it has been discovered that applying a square-wave pulse charge signal to charge a battery may degrade the life of the battery or may introduce inefficiencies in the charging of the battery. For example, the abrupt application of charge current (e.g., the sharp leading edge of a square-wave pulse) to the electrode (typically the anode) of the battery may cause a large initial impedance across the battery terminals resulting in a loss of transfer of power to the battery, lessening the efficiency of the charging process and/or damaging portions of the battery under charge, among other problems.

Rapid changes in the charge signal experienced from square pulses to the battery may introduce noise comprised of high-frequency harmonics, such as at the leading edge of the square-wave pulse, the trailing edge of the square-wave pulse, and during use of conventional reverse pulse schemes. Such high harmonics result in a large impedance at the battery electrodes. This high impedance may result in many inefficiencies and degradation of the battery, including capacity losses, heat generation, and imbalance in electrokinetic activity throughout the battery, undesirable electrochemical response at the charge boundary, and degradation to the materials within the battery that may damage the battery and degrade the life of the battery. Further, cold starting a battery with a sharp bonding edge pulse introduces limited faradaic activity as capacitive charging and diffusive processes set in. During this time, proximal lithium will react and be quickly consumed, leaving a period of unwanted side reactions and diffusion-limited conditions which negatively impact the health of the cell and its components. These and other inefficiencies are particularly detrimental during a relatively high current recharging of the battery typically associated with so-called fast charging.

As the characteristics of the battery 104 may change due to state of charge, temperature, and other factors, the shape of the charge signal 208 may also be changed over time. The signal may be defined, in part, with reference to a model 114 of the circuit components involved in generating the signal and/or filtering signal. The system may also use feedback. The generator may therefore, in some instances, perform an iterative process of monitoring or determining characteristics of the circuit and/or battery and adjust the model and/or shape of the charge signal 208 applied to the battery accordingly. This iterative process may improve the accuracy of signal shape and/or the efficiency of the charge signal used to recharge the battery, thereby decreasing the time to recharge the battery, extending the life of the battery (e.g., the number of charge and discharge cycles it may experience), optimizing the amount of current charging the battery, and avoiding energy lost to various inefficiencies, among other advantages.

Figure 3:
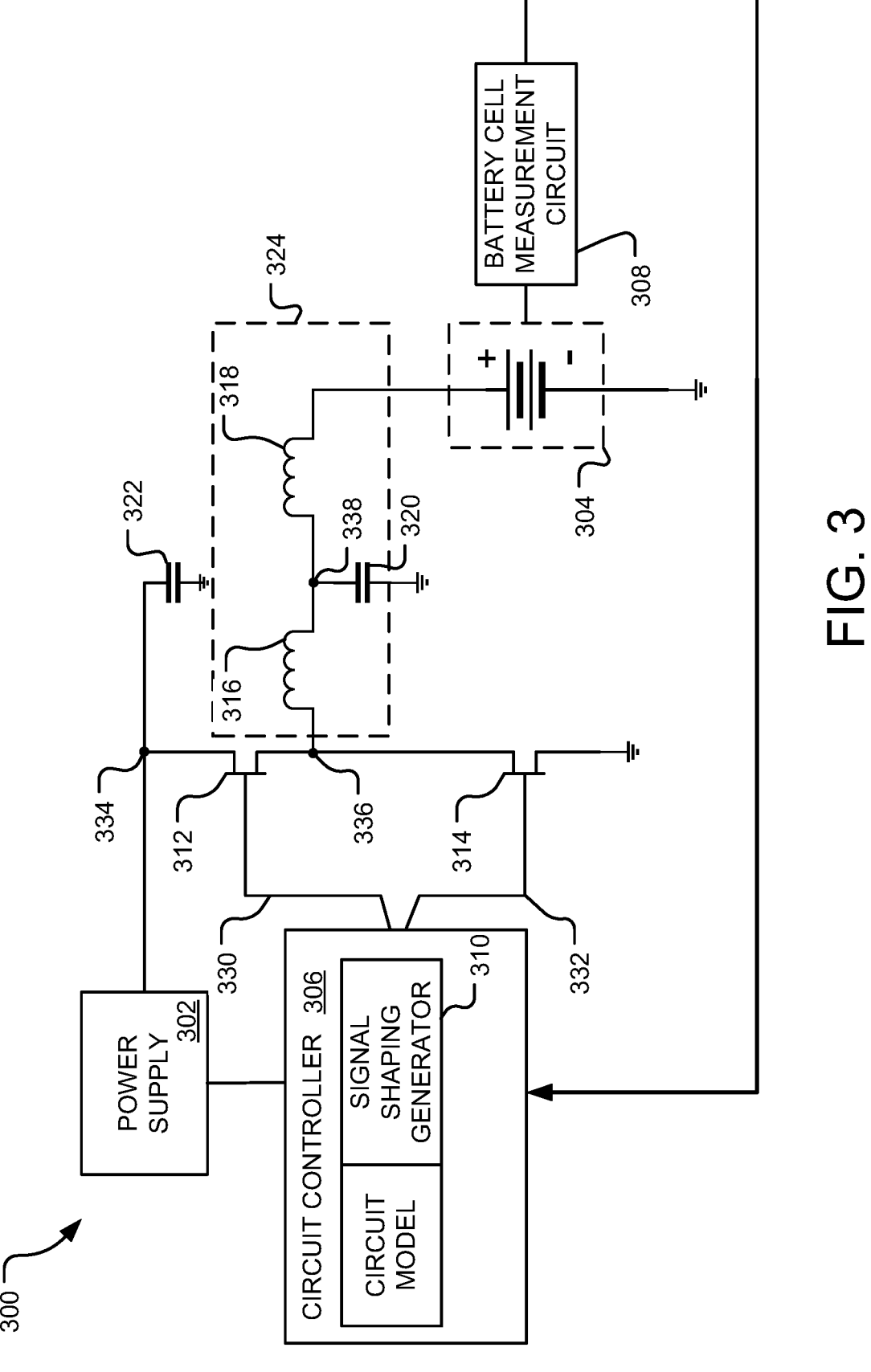
FIG. 3 is a schematic diagram illustrating a circuit for charging a battery in accordance with another embodiment.

FIG. 3 is a schematic diagram illustrating a circuit 300 for charging a battery 304 utilizing switching elements 312, 314 to generate an initial sequence of controlled pulses at node 336, which are then converted into a shaped charge signal by filter component 324, to produce a charge signal that is applied to the battery, in accordance with one embodiment. The circuit 300 includes elements introduced above with reference to generator of FIG. 1, including power supply 302, circuit controller 306, battery measurement circuit 308, and battery 304. Other elements illustrated in the circuit 300 of FIG. 3 may be included in charge signal shaping circuit and/or the filter of FIG. 1. As explained in more detail below, the circuit controller 306, in coordination with a circuit model, may provide one or more control signals 330, 332 to elements (e.g., switches 312 and 314) of the circuit 300 as part of the process to shape a current or voltage signal to charge the battery 304. The circuit controller 306 may be implemented through a FPGA device, a microcontroller, processor, an ASIC, or any other programmable processing device. In one implementation, the circuit controller 306 may include a charge signal shaping generator 310 to control the switches to produce a sequence of pulses at node 336 that produce the shape of the charge signal to be applied to the battery 304.

As introduced above, rather than an extensive feedback environment using detailed feedback of various signal and battery characteristics, the generator may use a model. At a simple level, the model is of an inductor in series with a resistance representative of inductors and the resistance of filter circuit 324 as well as the battery 304. The model may thus be an inductor value in series with a resistance value. In the presence of a controlled sequence of pulses at the input to the model, the model can predict the charge signal output to the battery. In other examples, the model may further include switch elements 312 and 314, as well as power supply 302 and capacitor 322. The model thus may also be able to model the control sequences to the switches that produce the input pulses to the filter 324 and analyze the modeled charge waveform produced by the model. Since various aspects of the present disclosure involve generating a carefully controlled charge waveform that is not a conventional and simple constant current, constant voltage or square edged pulse type charge signal, accurate reproduction of a targeted or planned charge signal into an actual charge signal is important. Moreover, in many charging environments the use of the model is beneficial as overly complicated measurement and feedback systems are too expensive, consume too much energy, are too slow, consume to much processor architecture real estate or the like to be practical and/or effective.

Nonetheless, particularly in the calibration sequence discussed below, the generator 300 may also receive measurements of characteristics of the battery from the battery measurement circuit 308 for use in confirming the model, altering the model, and/or determining the shape of the charge signal. Moreover, in some circumstances, battery manufactures may suggest or require certain attribute of a battery be monitored, such as open circuit voltage or the like, during charging. However, as explained in more detail below, such a feedback mechanism may occur at a rate that does not allow for effective shaping of the charge signal or is performed in a way that requires less costly and complicated feedback elements such that the model may be utilized to determine the control signals 330, 332 for controlling the elements of the circuit 300 with or without a feedback mechanism.

As introduced, the circuit 300 may include one or more components to shape a charge signal for charging a battery 304. In the implementation shown, the circuit 300 may include a first switching element, e.g., transistor 312, and a second switching element, e.g., transistor 314, connected to an output 334 of the power supply 302. The first transistor 312 may receive an input signal, such as pulse-width modulation (PWM) control signal 330, to operate the first transistor 312 as a switching device or component. In general, the first transistor 312 may be any type transistor, e.g., a FET or more particularly a MOSFET, a GaN FET, Silicon Carbide based FETs, or any type of controllable switching element for controllably connecting a first inductor 316 to the output 334 of the power supply 302. For example, the first transistor 312 may be a FET with a drain node connected to the first inductor 316, a source connected to the power supply 302, and a gate receiving the control signal 330 from the circuit controller. In various embodiments, the filter circuit 324 may also have various other possible inductive elements. For example, inductor 316 and or inductor 318 may be substituted with a transformer, where each or both sides (e.g., primary and secondary) of the transformer may be considered inductive elements. The control signal 330 may be provided by the circuit controller 306 to control the operation of the first transistor 312 as a switch that, when closed, connects the first inductor 316 to the power supply 302 such that a current from the power supply flows through the first inductor 316. The second transistor 314 may receive a second input signal 332 and may also be connected to the drain of the first transistor 312 at node 336. In some instances, the second input signal 332 may be a PWM signal opposite of the first control signal 330 to the first transistor 312. In alternative arrangement, as discussed below with reference to FIG. 5, transistor 314 may be substituted with a diode. Nonetheless, when the first transistor 312 is closed to connect the first inductor 316 to the power supply 302, the second transistor 314 is open. When the first transistor 312 is open, conversely, the second transistor 314 is closed, connecting node 326 and the first inductor 316 to ground. Although the first control signal 330 and the second control signal 332 are described herein as opposing signals to control the transistors into opposing states, other techniques for controlling the switching elements 312, 314 may also be implemented with the circuit 300. The inductor value, the capacitor value, the time and frequency of actuating the transistors, and other factors can be tailored to generate a waveform and particularly a waveform with controlled harmonics to the battery for charging the same. With reference to the example charge signal illustrated in FIG. 2, the signal at node 336 may be a series of pulses between 0 volts and the about the rail voltage, e.g., the voltage at node 334 provided by the power supply 302. The pulses at node 336 may be of varying duty cycle and may be generated at varying frequency. Overall, however, the pulses are generated to produce a signal that is the same or nearly the same as the intended charge signal. So, for example, a signal like FIG. 2 would be at node 338 based on the combination of pulses present at node 336. Depending on the signal, 10s to 1000s (or more) pulses may be generated to form the desired charge signal.

In addition to the first inductor 316, other components may be included in the circuit 30. In particular, the circuit 300 may include a first capacitor 322 connected between the output of the power supply 334 and ground. As discussed in more detail below, some of the energy required for a charge waveform may be provided by a combination of the power supply and the capacitor 322. In a portion of the circuit referred to as filter 324, a second capacitor 320 may be connected between the first inductor 316 (at node 338) and ground. A second inductor 318 may be connected between node 338 and an anode of the battery 304. The filter 324 of the circuit 300 may operate, in general, to prevent rapid changes to the charge signal applied to the battery 304. The filter may also convert the pulses at the input of the filter to a charge signal as well as filter any unintended high frequency noise from the battery. For example, upon closing of the first transistor 312 based on control signal 330, first inductor 316 and second inductor 318 may prevent a rapid increase in current transmitted to the battery 304. Such rapid increase in current may damage the battery 304 or otherwise be detrimental to the life of the battery. Moreover, the inductor 316 or inductors 316 and 318, alone or in combination with capacitor 320, may shape the waveform applied to the battery, and control of the signal applied to the inductor may provide for controlled shaping of the waveform. In another example, capacitor 320 may store energy from the power supply 302 while first transistor 312 is closed. Upon opening of the first transistor 312, which may be accompanied by closing transistor 314, the capacitor 320 may provide a small amount of current to the battery 304 through second inductor 318 to resist an immediate drop of current to the battery, and may similarly be used to controllably shape the waveform applied to the battery, particularly avoiding a sharp negative transitions. The filter circuit also removes other unwanted signals such as noise which may include relatively high frequency noise. Other advantages for charging of the battery 304 are also realized through filter circuit 324 but are not discussed herein for brevity.

It should be appreciated that more or fewer components may be included in charge circuit 300. For example, one or more of the components of the filter circuit 324 may be removed or altered as desired to filer the charge signal to the battery 304. Many other types of components and/or configurations of components may also be included or associated with the charge circuit 300. Rather, the circuit 300 of FIG. 3 is but one example of a battery charging circuit 300 and the techniques described herein for utilizing a circuit model for generating or otherwise determining control signals 330, 332 for shaping a charge signal may apply to any number of battery charging circuits. Additionally, various additional combinations of inductors or capacitors may be provided in series or parallel to those illustrated.

As described above, the signal shaping generator 310 of the circuit controller 306 may control the shape of the charge signal based on the model and/or feedback measurements of the battery 304 received from the battery measurement circuit 308. For example, an initial charge signal may be applied to the battery 304 and one or more measurements of the battery 304 (such as a current into battery or a voltage across the battery) may be obtained by the battery measurement circuit 308. These measurements may be provided to the signal shaping generator 310 which may, in turn, determine an error between an expected measurement of the battery characteristic and a measured value at the battery 304. Based on this determined error, the signal shaping generator 310 may control, via control signals 330, 332, the first transistor 312 and the second transistor 314 to adjust the shape of the charge signal to the battery 304. In other words, the signal shaping generator 310 may sculpt the charge signal transmitted to the battery 304 to generate an expected measured characteristic of the battery 304. As long as the feedback measurements are expected, the shape of the charge signal may be maintained by the signal shaping generator 310 via the control signals 330, 332. A detected difference between an expected measurement and a measured value, however, may cause the circuit controller 306 to alter the shape of the charge signal to bring the battery 304 response into an expected range of values. Such a process may not be done, may be done at the initiation of charge, at various time during charge, may be done periodically or intermittently, or may be done in response to some change or some metric (e.g., change in terminal voltage, state of charge, temperature).

In some instances, the feedback techniques used by the signal shaping generator 310 to alter or shape a charge signal to a battery 304 may arrive too slowly to effectively shape a fast-occurring charge signal. For example, a charge signal may include pulses occurring at a particular frequency, often the same or faster than the battery measurement circuit 308 can obtain battery characteristic measurements and/or the circuit controller 306 can adjust the shape of the charge signal in response to measured battery characteristics. As a result, a circuit controller 306 utilizing feedback measurements to adjust a shape of a charge signal is often unable to fine-tune the charge signal for optimal battery charging, particularly at a high-frequency charge signal.

Figure 4:
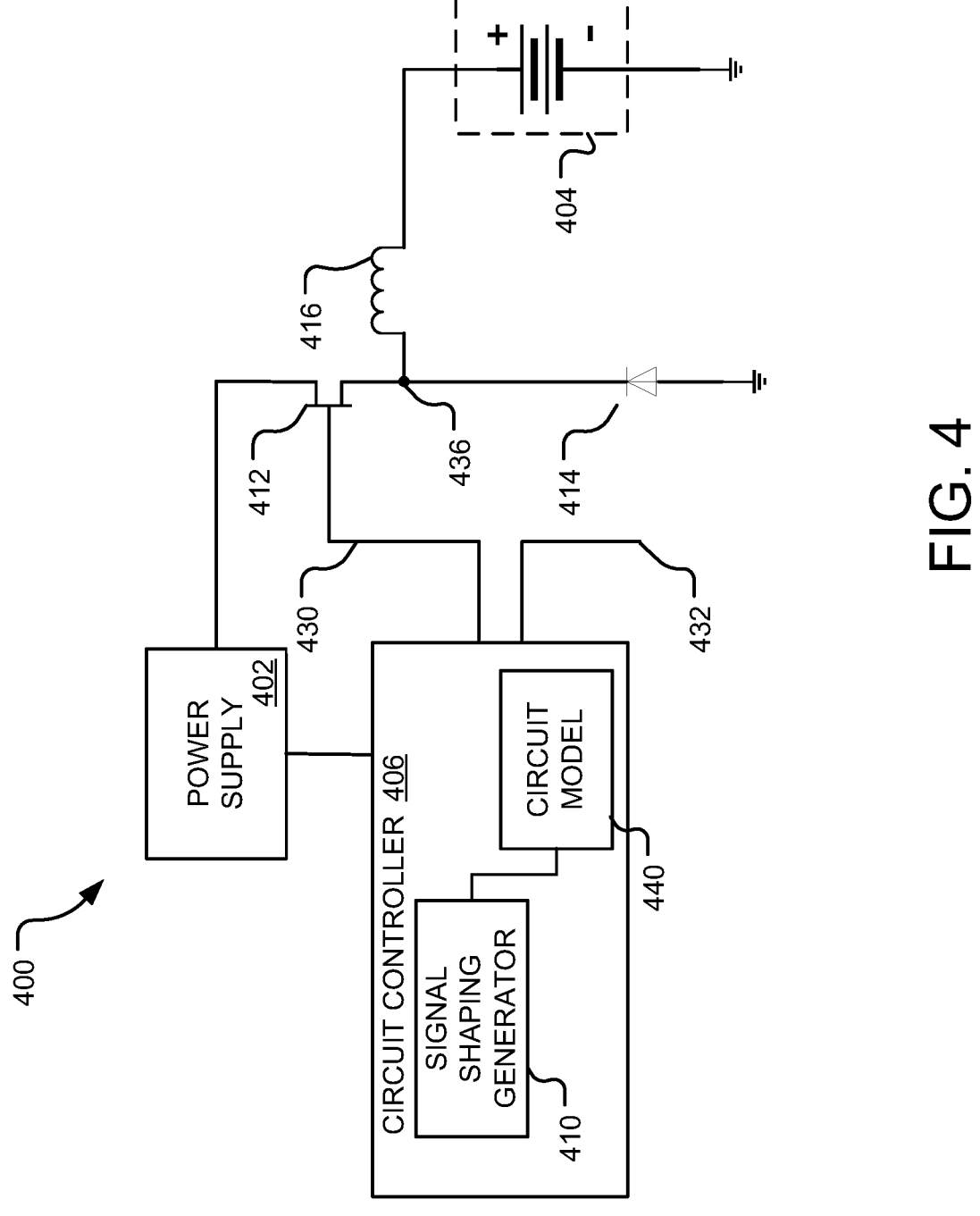
FIG. 4 is a schematic diagram illustrating a circuit for charging a battery in accordance with another embodiment.

FIG. 4 is a schematic diagram illustrating a circuit 400 for charging a battery 404 utilizing a circuit model 440 in accordance with one embodiment. The circuit 400 of FIG. 4 is an alternative version of the charge circuit 300 described above with reference to FIG. 3 and may include similar components, such as a power supply 402, a first transistor 412 or other type of electronic switch, a diode in place of the second transistor 414 or other type of electronic switch, battery 404 and circuit controller 406. While not shown, a battery measurement configuration may also be included. Like above, the first transistor 412 may be controlled by a control or input signal 430 to operate the transistor as a switch and alternately connect an inductor 416 to an output of the power supply 402. The filter may be considered the inductor 416 and may not include capacitor 320 or second inductor 318 of FIG. 3. In general, the first transistor 412 may be any type of FET transistor or any type of controllable switch device. The control signal 430 may be provided by the circuit controller 406 to control the operation of the first transistor 412 as a switch that, when closed, connects the inductor 416 to the power supply 402 such that the charge signal from the power supply flows through the inductor 416.

As noted above, the circuit 400 of FIG. 4 is an alternative version of the circuit 300 of FIG. 3. Many of the components of the filter portion of the charge circuit are not present. Such components may or may not be included with charge circuit 400.

In a variety of applications, cost and complexity may be issues that are to be minimized or avoided, if possible. Similarly, reliability may be gained through simplification. Thus, the circuit 400 of FIG. 4 may utilize a model 440 of some attributes of the circuit 400 to determine how to generate a charge signal at the output of the inductor 416 based on some target charge signal. The use of the model may avoid having to monitor values at discrete components and may avoid more complicated feedback measurements and control. In some instances, the circuit model 440 may model the components external to the circuit controller 406, such as power supply 402, first transistor 412, second transistor 414, inductor 416, and the battery itself to determine how to generate a particular target shaped charge waveform at the battery 404. In reference to FIG. 3, the model may also include the second inductor 418 and capacitor 42. In one implementation, the circuit model 440 may include a model of inductor 416, which comprises an inductor value in series with a resistance. At a high level, the controller determines a target waveform, which may be generated from a look-up table, based on battery characterization or combinations thereof, and references the inductor model to determine what combination of pulses at node 436 will produce the target shaped charge waveform when those pulses are applied at the input side of the inductor (node 436). The switch 412 is then controlled to produce the desired sequence of pulses and the target charge waveform is formed at the input to the battery. The model may also include a resistance value to account for wiring resistance and other resistances as well as the resistance of the battery itself. The modeled inductance may also include value representative of battery inductance. The model may model each inductor value separately or combine them into one modeled inductor value.

The components included in the model may have variable attributes to determine the effect of the component on an applied charge signal and adjust the model by adjusting the variable attributes of one or more of the modeled components. For example, the model for the inductor may include an inductance value and a series resistance value. The battery itself may be modeled with an inductor and resistance and may be arranged in series. Other modeled components, such as the switches 412, 414 and/or the battery 404 may also include various attributes to improve the accuracy of a simulation performed on the modeled components. Further, the attributes of the modeled components may be adjusted over time based on performance data, a characterization sequence, or other feedback data from the circuit components or based on calculation or a characterization method. For example, the charge signal of the circuit of FIG. 4 may be sampled and fed back to the circuit controller 406 at various points and a comparison of the received charge signal to an expected charge signal may be made by the controller. Based on a difference, the circuit controller 406 may alter or adjust one or more attributes of the components of the model to improve the accuracy of the model. The adjustments to the model components may be repeated over a period of time such that the adjustments may account for parasitic effects to the components.

In another example that may leverage the battery measurement circuit, the voltage at the battery terminals when a charge signal or characterization signal is being applied to the battery may be sampled at one or more times, e.g., at two times, and compared to expected voltage at that time. This characterization sequence is also discussed in additional detail below. In one example, a simple comparator may be used to determine if the measured voltage (at each time) is greater or less than the expected voltage (at each time). Depending on whether the respective voltages are greater or less than the expected voltage (it is possible that one value will be greater and the other value will be less), the system may adjust one or more attributes of the model in order to alter the charge signal. So, rather than determining the difference in values, a simpler greater or less than assessment is made. The charge or characterization signal is then regenerated using the adjusted model, and the greater or less than assessment is done again until the expected value matches the target value at the sampled times. Thus, the model is adjusted to move the sampled values of the charge signal in the direction of the expected values of the target signal until there is a match. It should be recognized that a match may include some margin of error or threshold such that an exact match is not required. Nonetheless, when the sampled measurements (e.g., voltages) of the signal at the battery meet the expected values, the one or more inductor model values are then used to generate the charge signal. Such a characterization may be repeated at various times during a charge signal to accommodate changes that may occur to circuit components due to heat or other factors as well as to account for changes the battery may experience due to state of charge, temperature or other factors.

Regardless of the components included in the circuit model 440, the controller determines the control signals to provide to the switches by referencing the model to determine what signal at node 436 (or 336) will generate the target charge waveform. For example, assume the signal shaping generator 410 determines the shape of the charge signal should be the arbitrary charge signal 208 of the signal graph 202 of FIG. 2. The circuit model 440 may apply or generate the shaped charged signal to the modeled circuit to obtain the expected charge signal at the output of the inductor 416. In more detail, the model may apply a sequence of pulses intended to generate the expected charge signal from the model. The circuit model 440 may thus control the first transistor 412 and second transistor 414 over the time period of the shaped charge signal 308 based on the circuit model 440 output to determine the expected charge signal through the inductor 416 (or the expected charge signal received at battery 404).

Through a comparison of the target charge signal to the expected charge signal output by the circuit model 440, an anticipated error between the target charge signal and the expected charge signal may be determined. In some instances, the signal shaping generator 410 may adjust the pulse sequence of the target charge signal to compensate for anticipated error as determined by the circuit model 440. By modeling the circuit performance and, in particular, the shape of the charge signal expected at the battery 404 based on an input charge sequence and the modeled components of the charge circuit (such as the inductor 416), the circuit controller 406 determines a difference between a target shape of a charge signal and an expected shape of the charge signal. By modeling the circuit and determining a difference between a target charge signal and an expected charge signal, the feedback mechanism of battery characteristics may be removed from the charge circuit and adjustments to the components of the charge circuit 400 may be based on the modeled circuit performance instead. Modeling and feedback measurement may also be used in combination, such as in a slower feedback loop.

In one implementation, the signal shaping generator 410 may output control signals 430, 432 to control first transistor 412 and second transistor 414, respectively, based on the determined error in the estimated charge signal received from circuit model 440. In other implementations, a charge circuit controlling mechanism of the circuit controller 406 may receive one or more inputs from the signal shaping generator 410 and generate the control signals 430, 432 for first transistor 412 and second transistor 414 to shape the charge signal according to the determined error. For example, the estimated error received from the circuit model 440 may indicate that some aspect of the charge signal at a particular time in the future is different than the target charge signal. At the occurrence at the particular time, the circuit controller 406 may provide control signals 430, 432 to transistors 412, 414 to shape the charge signal based on the determined difference, thereby compensating for the estimated error in the charge signal through the inductor 416 at that particular time. In this manner, the circuit controller 406 may adjust the shape of a charge signal to a battery 404 based on an estimated charge signal from a model of the charge circuit and not based on measured feedback from the battery 404. The circuit model 440 may thus allow the circuit controller 406 to adjust the shape of the charge signal at a rate that exceeds the frequency at which measurements of the battery 404 may be obtained and processed. The system may also calibrate the model as discussed in further detail below.

Figure 5:
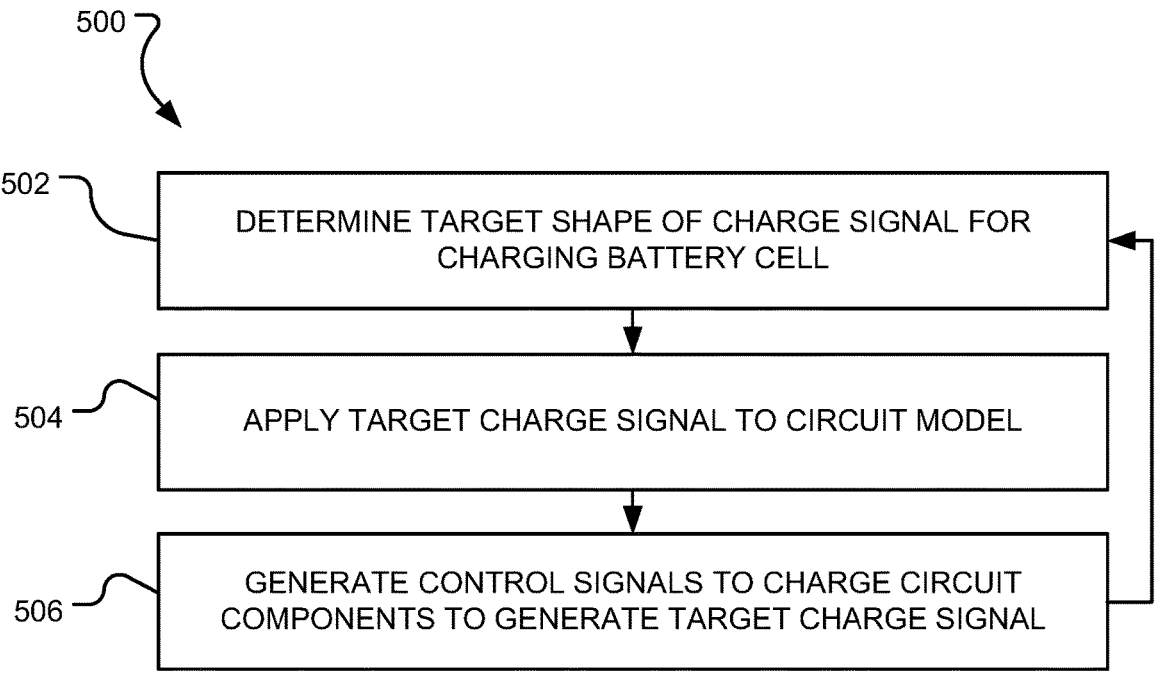
FIG. 5 is a flowchart illustrating a method for utilizing a circuit model to generate a charge signal in accordance with one embodiment.

Use of the circuit model 440 to generate a charge signal using a model, which may also include estimating an error in a target charge signal to an expected charge signal, is illustrated in the method 500 illustrated in the flowchart of FIG. 5. The operations of the method 500 of FIG. 5 may be modules, programs, algorithms, components, etc. of the circuit controller 406, the model, combinations of the same, or more generally the generator 100 in various embodiments, discussed above to produce an arbitrarily shaped charge signal to charge a battery 404. In one instance, the circuit controller 406 may perform one or more of the operations to control the first transistor 412 and/or the second transistor 432 to shape a charge signal from current provided by a power supply 402 and apply that charge signal to charge the battery 404. In other instances, however, the circuit controller 406 may perform the method 500 or operations of the method to control any charge circuit components to shape or otherwise alter a charge signal to a battery 404. The operations may be performed by one or more hardware components of the circuit controller 406, one or more programs of the controller, or a combination of both hardware and software components of the circuit controller.

Beginning in operation 502, the circuit controller 406 may determine a target shape of a charge signal for charging a battery 404. Determining a target shape may include accessing a target shape from memory. As described above, the target shape for the charge signal may be based on characteristics of the battery 404 under charge, such as a measured impedance, a state of charge, a battery temperature, a modeled ideal battery, etc. The shape of the charge signal may be any arbitrary shape albeit controlled, which may be include one or more specific harmonic attributes. The charge signal may extend for some time and may temporarily drop to a zero or slightly negative level before returning to a positive value. In various examples, the target shape of the charge signal may be generated by the signal shaping generator 410 of the circuit controller 406 based on a charge signal algorithm or any other executable instructions to determine a target shape of a charge signal for optimal charging of the battery 404.

In operation 504, the target charge signal may be applied to or otherwise provided to a model 440 of the charge circuit 400. The circuit model 440 may include a model of any number of components of the charge circuit 400 or any other charge circuit. In one embodiment, the circuit model 440 may comprise inductor 416 of the charge circuit 400. In another implementation, the circuit model 440 may include the components of filter circuit 324 of the charge circuit 300 of FIG. 3. Regardless of the components modeled, the circuit model 440 may receive the target charge signal and, through a simulation of the transistor control and resulting signal applied to the modeled inductor, generate or otherwise use the model to generate the expected charge signal to be applied to the battery. Thus, in operation 506, the circuit controller 406 may receive the expected charge signal at the battery 404 of the modeled circuit. For example, the circuit model 440 may comprise the inductor 416 component of the charge circuit. A target charge signal may be input to the modeled inductor (such as through a modeled control of the switches 412, 414 to generate the target charge signal) and, based on a simulation of the target charge signal as the signal is transmitted through the modeled inductor, an expected charge signal at the output of the modeled inductor may be output by the circuit model 440. As noted, while the model is described as including a modeled inductor, it may include an inductor value as well as a resistance value, which may be in series with the modeled inductor, and may represent various resistive features of the filter and otherwise. As the inductor 416 is directly connected to the battery 404, the expected charge signal may be the charge signal as applied to the battery 404 to charge the battery. For circuit models that include other or different components, the effect on the charge signal by each component may be modeled and an output of the charge signal arriving at the battery 404 may be determined. Regardless of the number and configuration of components modeled in the circuit model 440, the output of the model indicates the effect the components may have on an input charge signal such that an estimated charge signal at the battery 404 may be determined.

The circuit controller 406 may also determine a difference between target charge signal provided as an input to the circuit model 440 and the expected charge signal output by the model. If the expected charge signal as the battery 404 as simulated on the circuit model 440 is different than the target charge signal generated by the signal shaping generator 410, the circuit controller 406 may, in operation 510, adjust the shape of the target charge signal based on the determined difference or adjust the model components to deliver the target. In other words, the circuit controller 406 may generate one or more control signals to the first switching device 412 and/or the second switching device 414 to account for the effect the circuit components may have on the charge signal such that the charge signal applied to the battery 404 takes the shape as determined by the signal shaping generator 410. For example, when a target charge signal shape is determined, the circuit controller 406 may generate control signal 430 for first transistor 412 and/or control signal 432 for second transistor 414. In one instance, control signal 430 may be opposite control signal 432 such that the switching of transistors occurs in opposite states (e.g., an open first transistor occurs at the same time as a closed second transistor and vice versa). In general, however, control signals for any number of components of the charge circuit may be generated and transmitted to the components of the charge circuit to generate the shaped charge signal for charging the battery. Regardless of how the charge circuit in controlled, the control signals may be based on the circuit model 440 and a simulation of a target charge signal on the circuit model to estimate an error between the target charge signal and the expected charge signal at the battery. The use of the circuit model 440 may be utilized in place of feedback, or in addition to feedback, of one or more characteristics of the battery 404 to improve the efficiency and speed at which the charge signal is shaped.

Although discussed above as replacing the feedback of measured values of the battery 404, the systems, circuits, and methods discussed above may utilize some type of feedback mechanism to aid the signal shaping generator 410 in determining a target charge signal shape. For example, the charge circuit 400 of FIG. 4 may include a battery measurement circuit, such as that illustrated in FIG. 3, to provide a measured current and/or voltage of the battery to the control elements. However, rather than utilize the feedback to generate pulses of the charge signal, the feedback may be used by the signal shaping generator 310 to calculate an impedance or any other characteristic of the battery 404. Additionally, measurements may be used to calibrate the model. Such calculations may be used by the generator to determine the target shape of the charge signal, but the measurements may be obtained at a slower pace than, for example, a frequency of the charge signal. As such, measurements and calculations of the battery may still be obtained and used by the various control units and model while also providing a fast alteration to the shape of the charge signal.

Through the circuits and methods described herein, a prediction of a charge signal at the battery may be generated and the transistors may be controlled accordingly. As described above, transistors are typically controlled through a fast-changing PWM signal. While FIG. 4 is extensively referenced regarding the method of FIG. 5, the technique may be used with other alternatives including that shown in FIG. 3. Through the circuit model, the control of the transistor or transistors, may not be synchronized to an external clock but may, instead, appear as a random digital signal at the gate of the transistors. Noting that it appears random but is controlled to produce the desired charge signal. Several advantages are gained using the circuit model, including but not limited to, simplicity of design, difficulty in reverse-engineering as the control signals appear as random digital signals, and increased accuracy in charge signal shaping. In particular, the switching of the transistors may be controlled in increments of 10 ns or less, much faster than circuits that use feedback measurements to adjust the shape of the charge signal. This allows for very small adjustments in output current. Further, the circuit model 440 may track minimum on and off times for the transistors and incorporate that tracking into control of the transistors, reducing switching losses and overall stability of the transistors.

Figure 6:
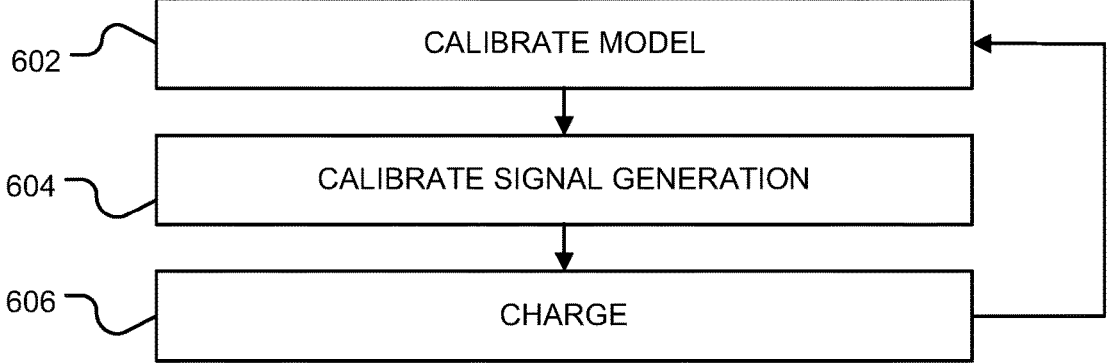
FIG. 6 is a flowchart illustrating a method for utilizing a circuit model to generate a charge signal in accordance with another embodiment.

FIG. 6 is another example method of charging a battery using a circuit model to generate some arbitrarily shaped albeit controlled charge waveform, according to aspects of the present disclosure. Unlike any number of alternative charging techniques including pulse charging, which uses conventional square edge shaped pulses of variable width and/or frequency, constant current or constant voltage, the present technique generates a charge signal of some targeted shape that is not a conventional square wave or a constant current or constant voltage signal. Accordingly, additional circuit features, such as those of the FIGS. 3 and 4, are provided to generate the shape. At a high level and referring to the example of FIG. 3, switches 312 and 314 are controlled in a coordinated fashion to produce a sequence of pulses, when 312 is on and 314 is off, a pulse at 336 is present with some voltage about what is present at node 334 less any voltage drop across transistor 312. The pulse sequence at 336 is controlled to produce the target charge waveform, which the sequence of pulses at inductor 316 are transformed into beginning at node 338.

Figure 7:
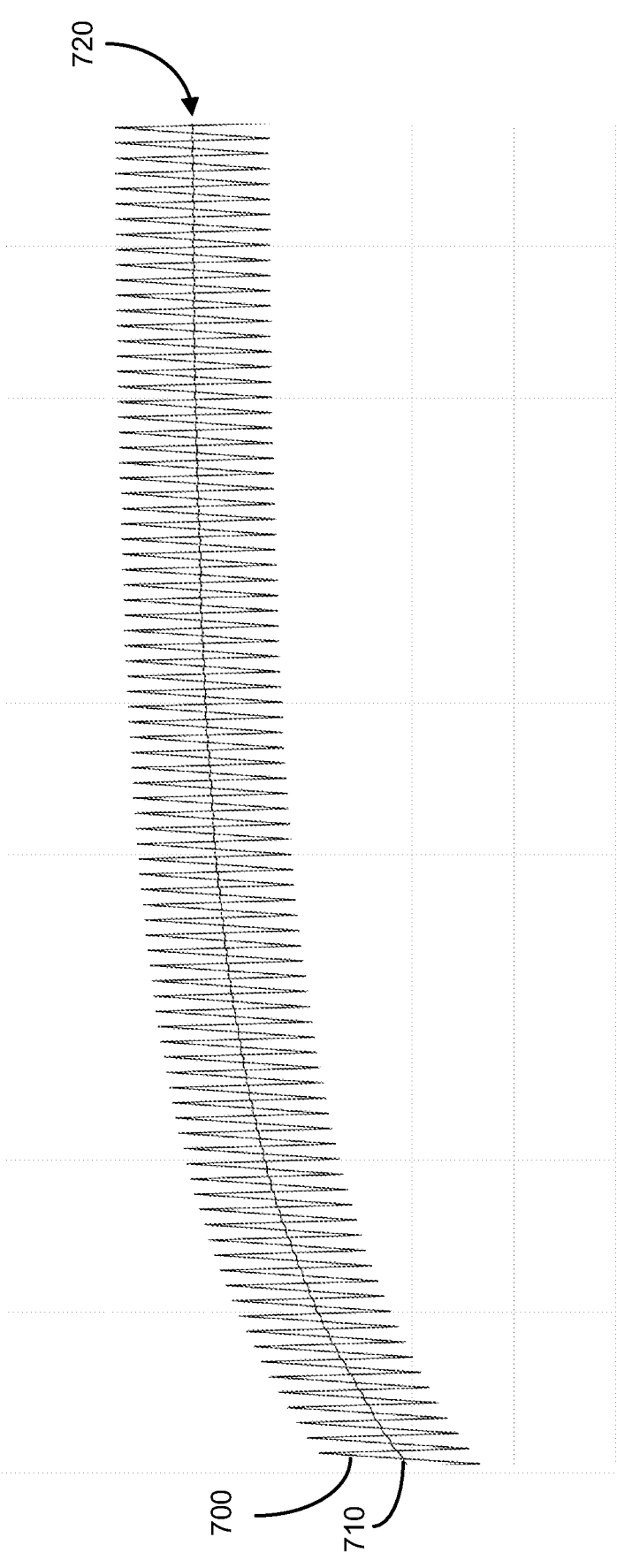
FIG. 7 is an example of a generated charge signal at a first inductor of a filter circuit and at a second inductor of the filter circuit, where the generated charge signal is based on a model of the filter circuit.

FIG. 7 illustrates another example of a portion of charge waveform. In the portion of the example illustrated, the charge waveform 700 at node 338 is overlaid with the charge waveform 710 at the input to the battery, after further processing by the second inductor 318. Here, it can be seen that the charge waveform 700 at node 338 is an alternating signal, somewhat sinusoidal in shape, alternating about a nominal non-zero voltage 720 that is rising from left to right. Thus, control pulses at node 336 result in an alternating pattern and a nominal rising non-zero voltage. The pulse width and frequency can be controlled to produce the pattern at node 338 after processing by the first inductor. The alternating charge signal at node 338 is then further processed in the second inductor 318 to produce a charge waveform 710 that is applied to the battery. The alternating pattern remains present but is substantial dampened by the second inductor such that its amplitude is dramatically less than at node 338, and the charge current is what is intended. The nominal value of the alternating pattern at node 338 after the first inductor is effectively the remaining charge signal after the second inductor.

The controller 306 uses the circuit model to generate the control signals for the switches to produce the desired charge waveform. In a charge sequence, the system may first calibrate the model. In one example, the model comprises an inductor in series with a resistance. At a simple level, the model may comprise an inductor representative of inductor 416. In another alternative, the model may comprise an inductor (or inductors) of inductors 316 and 318. Further, the model may also include an inductor value of the battery being charged. Similarly, the model may include a resistance value accounting for various attributes of the circuit 324, for example, including battery resistance and wiring resistance (or whatever filter circuit is employed). In a model with an inductor value representative of the filter circuit inductance and resistance, there may be a tunable or settable inductance value and a resistance value.

Figure 8:
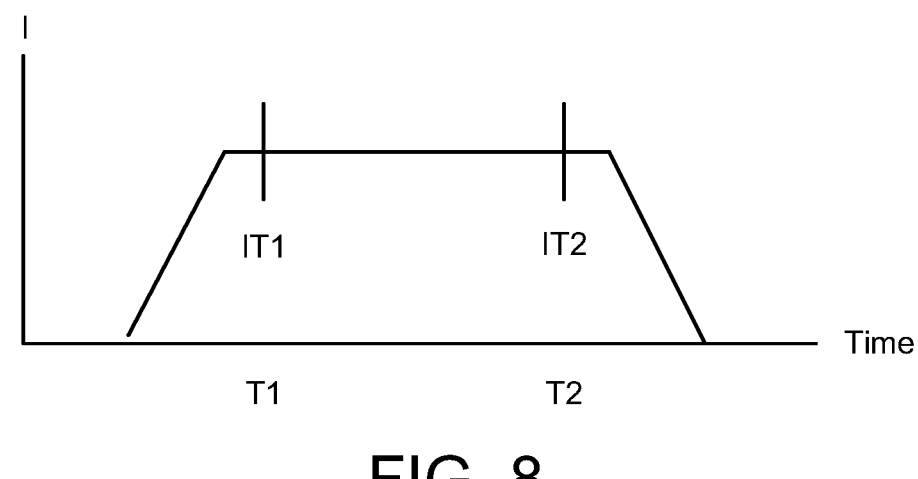
FIG. 8 is an example of a test signal used to calibrate the model.

Calibration involves generating a test signal, which may be a charge signal or dedicated test signal and determining if the charge signal at the input to the battery matches the intended target signal. If the signal matches, then the model is considered accurate and the model parameters are not adjusted. To determine a match, in one example, a calibration test signal is applied to the battery, an example of such a test signal being illustrated in FIG. 8. The calibration signal has a first target current (IT1) and a second target current (IT2). In one example and as shown, the first and second target currents are intended to be the same and the test signal has a flat top and a generally trapezoidal shape, as shown, with a gradually rising leading edge and a gradually falling trailing edge. As noted elsewhere, the target and measurement may also be a target voltage and a measurement of voltage. To ensure that the current level of the test signal has settled, after the rising edge, the measurements at time T1 is taking some time after the transition to the flat top. Similarly, to help ensure that the second current is measured before the signal begins returning to zero, the second measurement is taking before the falling edge of the test signal. The system, such as through the battery measurement circuit 408, asses the actual current at time T1 and at time T2, and compares the actual current measurements at each time to the expected first and second target currents at the respective times.

The goal of calibration is to have the actual measurements, whether voltage or current, at T1 and T2 match those of the target, which indicates that the model matches actual circuit performance. The calibration technique may adjust the inductor value of the model and/or the resistance value of the model. While actual measurement comparisons of the currents at times T1 and T2 can be compared to the target currents, in one example, a more computationally simple difference technique is employed. Namely, the system includes a comparator that determines if current (or voltage) at time T1 is greater or less than the target current (or voltage) at time T1 and does the same at time T2 relative to the target current (or voltage) at time T2. When one value matches and the other does not, the system adjusts the inductor value. Similarly, when one value is higher than the target current and the other signal is lower than the target current, the system adjusts the inductor value. In either case, the differences are indicative of a test signal with a sloped top as opposed to the targeted flat top, and a sloped top is indicative of mismatch in the model inductance. In contrast, if both measured values are greater or less than the respective target values, it is indicative of a mismatch in the model of the resistance. If the measured voltages, in the example of test and measurements using voltage, are less than the target, then the resistance is decreased, and if the measured voltages are greater than the target, then the resistance is increased. Of course, both inductance and resistance may need calibration. The system, in one example, iteratively adjusts the model by repeatedly running the test signal, adjusting the inductance and/or resistance, and measuring the current (or voltage) at times T1 and T2 until the measured values match those of the target at both times. The model may be considered calibrated when the measured voltages are within some percentage or threshold in relation to the target, e.g., within 0.01%, 0.1%, 1%, or some other tolerance depending on any particular implementation, the accuracy specified or required for the application, etc.

After model calibration, the system may begin charging. Alternatively, the system may further calibrate the model to ensure that the pulse sequence at the filter input will generate the target waveform. In some examples, the model also includes the switch or switches that produce pulse sequences at the input of the filter to produce the target charge waveform. The model is programmed to produce a target voltage and/or target current commensurate with the target waveform at any specific point in time. Pulses at 336 produce that target waveform after processing by the filter. In one example, such as to produce the target waveform of FIG. 2, the target waveform has a distinct beginning time and ending time, where the signal transitions from zero voltage (and/or zero current depending on how measured and/or controlled) to a non-zero value of the target charge waveform. The same occurs at the ending time, where the voltage and/or current transition to zero from the non-zero value of the charge waveform. It is also possible to momentarily drive the charge current below zero between charge signals. In various possible examples, the discrete charge waveform is repeated some number of times, which may be substantial and account for a significant change in charge percentage, and until the system determines some change in the charge control is needed, which can be change to the charge signal and/or a recalibration of the model. Regardless, the model may further calibrate itself by generating a target pulse sequence into the calibrated filter elements of the model, to ensure that the desired target signal is generated by the model. This part of the calibration may be done strictly through running an intended signal through the model and without measuring actual circuit performance or the actual charge signal. The switch control may be adjusted in any number of ways to adjust pulsing of the filter circuit to produce the target waveform. For example, the on time of switch 312 versus switch 314 may be adjusted to produce pulses of different width, and the frequency of pulsing at 336 may also be adjusted. The width and frequency of pulses needed to produce a charge signal of the variety of shapes desired, and the value of the shape at a very particular point in time, may vary across a nearly infinite combination of pulses. Nonetheless, the system may iterate the switch control until the modeled filter circuit is producing the desired target charge waveform at the battery, and then beginning charging using the calibrated control and model to produce the charge waveform.

It should be recognized that calibration may not occur in every charge cycle and conversely aspects of calibration may occur within a charge cycle. For example, the inductance and/or resistance of the filter circuit that are modeled may change during a cycle or over many charge cycles due to various electrochemical and electrodynamic effects of the battery over time and cycles, due to heat, due to charge current values and other reasons; similarly, circuit elements may change due to heat and cycles among other reasons. It should be also recognized that different elements of the filter circuit may have different effects on the accuracy of the modeled circuit performance. For example, capacitor 320 may be present in the filter but its value may not have a significant effect on modeled performance and hence its value is not included in the model. Similarly, other components outside the filter circuit may be modeled such as the power supply. Similarly, capacitor 322 may be modeled.

In one example, as noted above, the target waveform may be a repeated shaped charge signal, and the charge signal may be at a zero state between repeating shaped charge signals. The zero state may allow any minor errors in the filter circuit production of the targeted shape to not propagate across subsequent shapes. Additionally, capacitor 322 is included to ensure that the system has sufficient charge energy to produce the targeted shape. In some instances, if the power supply is insufficient on its own to produce a charge current and voltage at a particular point in time of the target charge waveform, then the capacitor stores energy to meet that demand. Between target charge signals, the capacitor may recharge so that it has available energy for the next sequence. Given this role in overall charge signal delivery, capacitor 322 may also be modeled and considered during calibration, such as control signal calibration.

Regardless, when the model is calibrated and/or the switch control and micro-pulsing of the filter circuit are calibrated, the system initiates charging.

Further still, the charging circuits and methods described herein may apply to a battery comprising a single cell or multiple cells. In a multiple cell configuration, the cells may be arranged in a series configuration, a parallel configuration, or a combination of series and parallel configurations. Multiple battery cells arranged in a series configuration may reduce the overall current used to charge the battery cells as the current is divided among battery cells in the series connection. By connecting the battery cells in series, the charging circuits may require less current, further improving the efficiency of the charging circuit.

Figure 9:
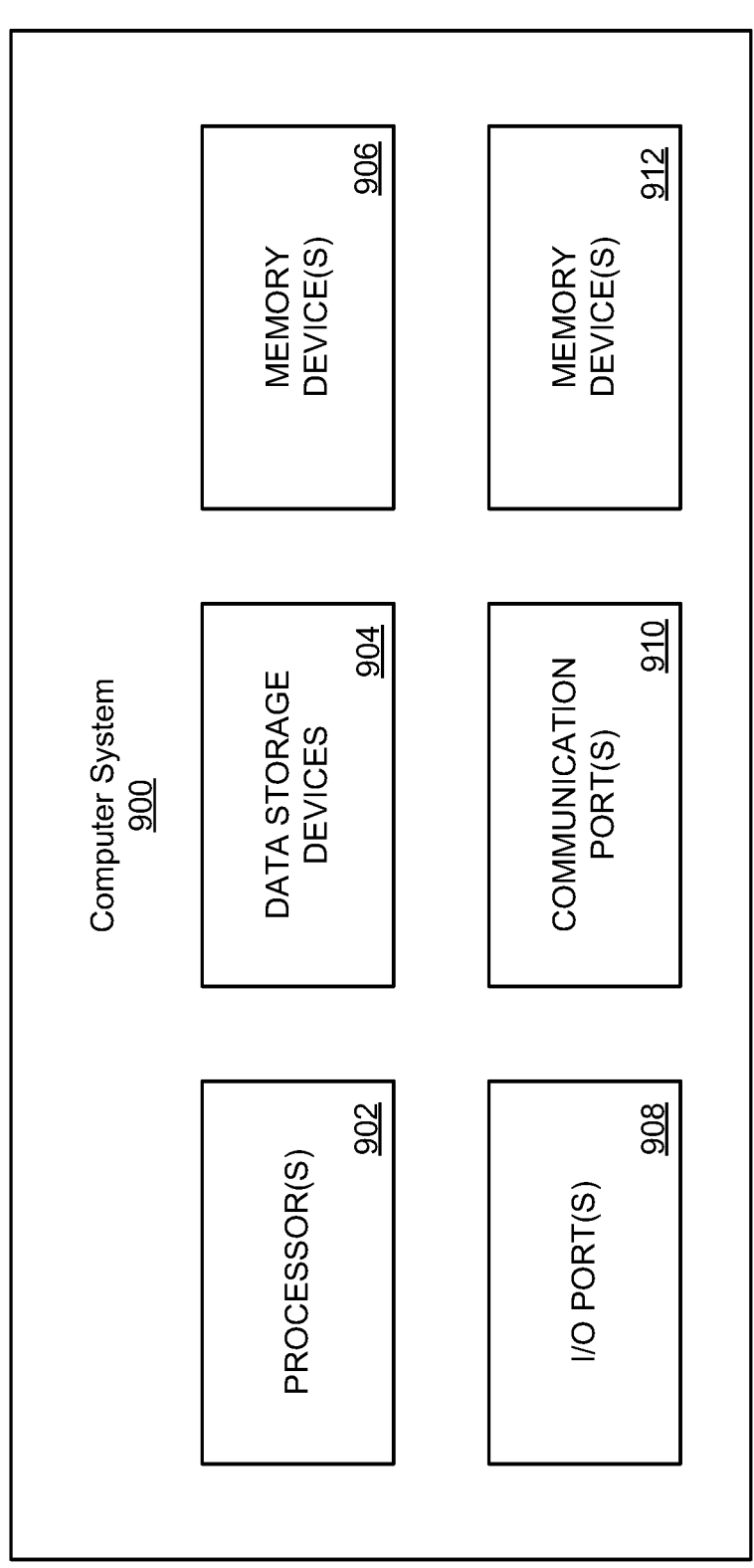
FIG. 9 is a diagram illustrating an example of a computing system which may be used in implementing embodiments of the present disclosure.

Referring to FIG. 9, a detailed description of an example computing system 900 having one or more computing units that may implement various systems and methods discussed herein is provided. The computing system 900 may be part of a controller, may be in operable communication with various implementation discussed herein, may run various operations related to the method discussed herein, may run offline to process various data for characterizing a battery, and may be part of overall systems discussed herein. The computing system 900 may process various signals discussed herein and/or may provide various signals discussed herein. For example, battery measurement information may be provided to such a computing system 900. The computing system 900 may also be applicable to, for example, the controller, the model, the tuning/shaping circuits discussed with respect to the various figures and may be used to implement the various methods described herein. It will be appreciated that specific implementations of these devices may be of differing possible specific computing architectures, not all of which are specifically discussed herein but will be understood by those of ordinary skill in the art. It will further be appreciated that the computer system may be considered and/or include an ASIC, FPGA, microcontroller, or other computing arrangement. In such various possible implementations, more or fewer components discussed below may be included, interconnections and other changes made, as will be understood by those of ordinary skill in the art.

The computer system 900 may be a computing system that is capable of executing a computer program product to execute a computer process. Data and program files may be input to the computer system 900, which reads the files and executes the programs therein. Some of the elements of the computer system 900 are shown in FIG. 9, including one or more hardware processors 902, one or more data storage devices 904, one or more memory devices 906, and/or one or more ports 908-912. Additionally, other elements that will be recognized by those skilled in the art may be included in the computing system 900 but are not explicitly depicted in FIG. 9 or discussed further herein. Various elements of the computer system 900 may communicate with one another by way of one or more communication buses, point-to-point communication paths, or other communication means not explicitly depicted in FIG. 9. Similarly, in various implementations, various elements disclosed in the system may or not be included in any given implementation.

The processor 902 may include, for example, a central processing unit (CPU), a microprocessor, a microcontroller, a digital signal processor (DSP), and/or one or more internal levels of cache. There may be one or more processors 902, such that the processor 902 comprises a single central-processing unit, or a plurality of processing units capable of executing instructions and performing operations in parallel with each other, commonly referred to as a parallel processing environment.

The presently described technology in various possible combinations may be implemented, at least in part, in software stored on the data stored device(s) 904, stored on the memory device(s) 906, and/or communicated via one or more of the ports 908-912, thereby transforming the computer system 900 in FIG. 9 to a special purpose machine for implementing the operations described herein.

The one or more data storage devices 904 may include any non-volatile data storage device capable of storing data generated or employed within the computing system 900, such as computer executable instructions for performing a computer process, which may include instructions of both application programs and an operating system (OS) that manages the various components of the computing system 900. The data storage devices 904 may include, without limitation, magnetic disk drives, optical disk drives, solid state drives (SSDs), flash drives, and the like. The data storage devices 904 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 906 may include volatile memory (e.g., dynamic random-access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 904 and/or the memory devices 906, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 900 includes one or more ports, such as an input/output (I/O) port 908, a communication port 910, and a sub-systems port 912, for communicating with other computing, network, or vehicle devices. It will be appreciated that the ports 908-912 may be combined or separate and that more or fewer ports may be included in the computer system 900. The I/O port 908 may be connected to an I/O device, or other device, by which information is input to or output from the computing system 900. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 900 via the I/O port 908. In some examples, such inputs may be distinct from the various system and method discussed with regard to the preceding figures. Similarly, the output devices may convert electrical signals received from computing system 900 via the I/O port 908 into signals that may be sensed or used by the various methods and system discussed herein. The input device may be an alphanumeric input device, including alphanumeric and other keys for communicating information and/or command selections to the processor 902 via the I/O port 908.

The environment transducer devices convert one form of energy or signal into another for input into or output from the computing system 900 via the I/O port 908. For example, an electrical signal generated within the computing system 900 may be converted to another type of signal, and/or vice-versa. In one implementation, the environment transducer devices sense characteristics or aspects of an environment local to or remote from the computing device 900, such as battery voltage, open circuit battery voltage, charge current, battery temperature, light, sound, temperature, pressure, magnetic field, electric field, chemical properties, and/or the like.

In one implementation, a communication port 910 may be connected to a network by way of which the computer system 900 may receive network data useful in executing the methods and systems set out herein as well as transmitting information and network configuration changes determined thereby. For example, charging protocols may be updated, battery measurement or calculation data shared with external system, and the like. The communication port 910 connects the computer system 900 to one or more communication interface devices configured to transmit and/or receive information between the computing system 900 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 910 to communicate with one or more other machines, either directly over a point-to-point communication path, over a wide area network (WAN) (e.g., the Internet), over a local area network (LAN), over a cellular (e.g., third generation (3G), fourth generation (4G), fifth generation (5G)) network, or over another communication means.

The computer system 900 may include a sub-systems port 912 for communicating with one or more systems related to a device being charged according to the methods and system described herein to control an operation of the same and/or exchange information between the computer system 900 and one or more sub-systems of the device. Examples of such sub-systems of a vehicle, include, without limitation, motor controllers and systems, battery control systems, and others.

The system set forth in FIG. 9 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments, also referred to as implementations or examples, described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment", or similarly "in one example" or "in one instance", in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

What is claimed:

1. A system for charging a battery comprising:
a first switch;
a first inductive element in operable communication with the switch;
a second inductive element in operable communication with the first inductive element; and
a processor in communication with the switch and in communication with a model, the processor configured to execute instructions to control the switch to generate a sequence of pulses at the first inductive element to produce a shaped charge waveform responsive to running the model to generate the shaped charge waveform, wherein the model comprises a model of the first inductive element, the second inductive element, and a battery.

2. The system of claim 1 wherein the first switch is operably coupled with a power supply and the processor is further configured to execute the sequence of pulses with the model and adjust the sequence of pulses to produce the shaped waveform.

3. The system of claim 1 wherein the model comprises a configurable inductance value and a configurable resistance value, and wherein the processor is further configured to execute instructions to calibrate the model by applying a known signal to the first inductive element and obtaining a first measurement at a first point on the known signal and a second measurement at a second point on the known signal, and changing at least one of the configurable inductance value or the configurable resistance value when at least one of the first measurement at the first point or the second measurement at the second point does not match a respective first intended measurement at the first point or a second intended measurement at the second point.

4. The system of claim 3 wherein the first measurement is a first current or a first voltage, the second measurement is a second current or a second voltage, and the respective first intended measurement is a first intended current or first intended voltage and the respective second intended measurement is a second intended current or a second intended voltage.

5. The system of claim 1 wherein the processor comprises a microcontroller.

6. The system of claim 1 further comprising a second switch in communication with the first switch at a common node, the common node operably coupled with the first inductive element.

7. The system of claim 6 wherein the first switch is a first transistor and the second switch is a second transistor.

8. The system of claim 6 wherein the first switch is a transistor and the second switch is a diode.

9. The system of claim 1 wherein the first inductive element is a first inductor.

10. The system of claim 9 wherein the second inductive elements comprises a second inductor coupled with the first inductor, the system further comprising a battery operably coupled with the second inductor to receive the shaped charge waveform and a capacitor coupled between the first inductor and the second inductor and neutral.

11. The system of claim 1 wherein the first inductive element is a part of a transformer.

12. The system of claim 1 further comprising a capacitor operably coupled with a power supply and the first switch, the capacitor configured to deliver energy to produce the shaped charge waveform.

13. The system of claim 1 wherein the model comprises an inductor value representative of the first inductive element, the second first inductive element in series with the first inductive element, and the battery.

14. The system of claim 13 wherein the model further comprises a resistance value.

15. The system of claim 14 wherein the inductor value is in series with the resistance value.

16. A method of charging a battery comprising:
from a processor in communication with a switch and in communication with a model of a filter, controlling the switch to generate a sequence of pulses at the filter to produce a shaped charge waveform responsive to running the model to generate the shaped charge waveform, wherein the filter comprises a first inductive element coupled with the switch, second inductive element coupled with the first inductive element, and a capacitor coupled between the first inductive element and the second inductive element and neutral.

17. The method of charging a battery of claim 16 further comprising:

generating a sequence of pulses at the first inductive element to produce a known signal from the filter; and when a measured attribute of the known signal does not match an intended measurement, calibrating the model by adjusting at least one attribute of the model.

18. The method of claim 17 wherein the at least one attribute of the model comprises a configurable inductance value and a configurable resistance value, calibrating the model further comprises:

applying the known signal to the filter; and obtaining a first measurement at a first point on the known signal and a second measurement at a second point on the known signal, and changing at least one of the configurable inductance value or the configurable resistance value when at least one of the first measurement at the first point or the second measurement at the second point does not match a respective first intended measurement at the first point or a second intended measurement at the second point.

19. The method of claim 16 wherein the model further comprises the switch.

20. The method of claim 19 wherein the model further comprises a capacitor operably coupled with a power supply and operably coupled with the switch.

* * * * *